US012628813B2

(12) United States Patent
Wenmakers et al.

(10) Patent No.: US 12,628,813 B2
(45) Date of Patent: May 19, 2026

(54) RODENT TRAP

(71) Applicant: STRYGOO BV, Geel (BE)

(72) Inventors: Dirk Ernest Rosalia Wenmakers, Dilsen-Stokkem (BE); Dries Verdonck, Geel (BE); Philippe Caers, Geel (BE)

(73) Assignee: STRYGOO BV, Geel (BE)

( * ) Notice: Subject to any disclaimer, the term of this patent is extended or adjusted under 35 U.S.C. 154(b) by 287 days.

(21) Appl. No.: 18/014,501

(22) PCT Filed: Jul. 16, 2021

(86) PCT No.: PCT/EP2021/069979
§ 371 (c)(1),
(2) Date: Jan. 5, 2023

(87) PCT Pub. No.: WO2022/013429
PCT Pub. Date: Jan. 20, 2022

(65) Prior Publication Data
US 2023/0255189 A1     Aug. 17, 2023

(30) Foreign Application Priority Data
Jul. 16, 2020    (BE) .................................. 2020/5534

(51) Int. Cl.
*A01M 23/06*          (2006.01)
(52) U.S. Cl.
CPC .................................. *A01M 23/06* (2013.01)
(58) Field of Classification Search
CPC ....... A01M 23/04; A01M 23/06; A01M 23/18
See application file for complete search history.

(56) References Cited

U.S. PATENT DOCUMENTS

| | | | | | |
|---|---|---|---|---|---|
| 1,880,640 | A | * | 10/1932 | Wood ..................... | A01M 23/12 43/74 |
| 2,110,678 | A | * | 3/1938 | Robbins ................ | A01M 23/18 43/72 |
| 5,519,962 | A | * | 5/1996 | Cerullo .................. | A01M 23/04 43/72 |
| 6,016,623 | A | * | 1/2000 | Celestine ............ | A01M 31/002 43/61 |
| 8,026,822 | B2 | * | 9/2011 | Borth .................... | A01M 23/00 340/573.2 |
| 9,801,367 | B2 | * | 10/2017 | Ferrante ................ | A01M 23/14 |

(Continued)

FOREIGN PATENT DOCUMENTS

| | | |
|---|---|---|
| BE | 1025966 A1 | 8/2019 |
| CN | 205143315 U | 4/2016 |

(Continued)

OTHER PUBLICATIONS

BE 1025966 and merged English translation (Year: 2019).*

(Continued)

*Primary Examiner* — Marisa V Conlon
(74) *Attorney, Agent, or Firm* — Amster, Rothstein & Ebenstein LLP

(57) ABSTRACT

Provided herein is a trap and related method for catching vermin, especially rats. The trap allows mechanical energy to be stored in an elastic element. This energy can be released momentarily in order to quickly actuate a trapdoor, a cover, from a closed position to an open position, in order to catch a rat thereby.

19 Claims, 9 Drawing Sheets

(56)     References Cited

U.S. PATENT DOCUMENTS 10,512,258 B2 * 12/2019 Baxter ................. A01M 23/08
11,083,188 B2 *   8/2021 Pinzone ............. A01M 31/002

FOREIGN PATENT DOCUMENTS

JP        H07-163286  A      6/1995
WO      2010/088717  A1     8/2010

OTHER PUBLICATIONS

KR 100912225 and merged English translation (Year: 2009).*
International Search Report and Written Opinion mailed on Oct. 14,
2021 issued in PCT International Patent Application No. PCT/
EP2021/069979.

* cited by examiner a)

b)

100

A-A a)

b)

a)

b)

RODENT TRAP

CROSS-REFERENCE TO RELATED APPLICATIONS

This application is a U.S. national stage entry under 35 U.S.C. § 371 of PCT International Patent Application No. PCT/EP2021/069979, filed Jul. 16, 2021, which claims priority to Belgian Patent Application No. BE2020/5534, filed Jul. 16, 2020, the contents of each of which are incorporated herein by reference in their entirety.

TECHNICAL FIELD

The invention relates to traps and related devices, and more particularly to rat traps and methods for catching rats and other vermin.

TECHNOLOGICAL BACKGROUND OF THE INVENTION

Various kinds and types of rat traps are known. Rat traps are used to keep the rat population under control. However, current rat traps can still be improved in one or more aspects. In particular, there is a need for devices for catching and neutralizing vermin in an efficient and animal-friendly manner.

Embodiments of such a trap are for example known from JP H07 163286 and CN 205 143 315 U which hold a cover of a trap, that is springloaded into a closed position by means of retractable linear actuators such as for example solenoids. A drawback of such actuators, is that there is a high risk of blockage and/or functional failure of the trap upon activation, which is the most critical part of the operation of the trap, as these linear actuators are typically engaged with a force of the springloaded cover transvers to their direction of movement, which provides for the risk that the movable part of these actuators is deformed under this load and which damages and/or blocks it and/or prevents reliable operation. Further in the extended state, when the actuator holds the cover, such actuators, such as for example solenoids, are typically only able to generate their minimal force. Upon activation, especially when subjected to increased friction between the actuator and the cover, for example as a result of wear and/or accumulation of dirt during usage of the actuator, there is a high risk of failure of the actuator to overcome this friction.

A further embodiment is known from BE 1 025 966, in which a rotary actuator is used for activation of the trap. According to this embodiment, the rotary actuator must ensure a fast closure of the trap, and must be able to reliably hold the door of the trap in the closed position, which requires a fast and powerful rotary actuator with a corresponding high level of energy consumption. Especially for battery operated traps, which can be installed more easily in remote areas, it is desired to reduce the energy consumption of the trap in order to prolong its operational life. Further in order to ensure a reliable operation of the trap, it must be ensured that the rotational axis of the actuator is precisely aligned with the rotational axis of the door such that a fast operation can be ensured, which requires high precision components and mounting of the different elements of the trap.

There is also a need for devices for catching and neutralizing vermin that can catch multiple animals over a period of time that can last a number of months.

There is also a need for devices for catching and neutralizing vermin that reduce or eliminate unpleasant odors and the risk of contamination.

There is also a need for traps that can quickly and painlessly eliminate vermin.

There is also a need for traps that can efficiently share diagnostic information and information about their catch with an operator.

SUMMARY

The invention and preferred embodiments thereof provide a solution to the aforementioned needs.

Thus provided herein is a trap for catching vermin, such as certain rodents, wherein the combination of a motor and a spring system allows the receptacle in which the animals are collected to be completely and quickly sealed in an efficient manner. More particularly, the invention provides a trap (100) for catching rodents comprising an actuator, a sensor (105), a receptacle (200), a cover (210), an opening (224), a feeder (230), an elastic element, and a connecting mechanism between the actuator and the cover (210) wherein the receptacle (200) comprises an opening (260) and the cover (210) is rotatably arranged on an edge of the opening (260) of the receptacle (200). The cover (210) is rotatable between an open position and a closed position. The cover (210) closes the opening (260) in the receptacle (200) in the closed position and the opening (260) in the receptacle (200) is not covered by the cover when the cover (210) is in the open position; the trap (100) is further characterized in that the actuator is controlled by a signal from the sensor (105) and in that the actuator is operatively connected to the cover (210). In certain embodiments, the trap comprises an actuator. In certain embodiments, the actuator comprises a motor or system for manually winding the elastic element.

The actuator (110) is configured to move the cover (210) from the open position to the closed position; the actuator, with a push, takes the trap out of the unstable equilibrium and the elastic element is configured to move the cover (210) from the closed position to the open position once the trap is taken out of the unstable equilibrium by the push from the actuator. In the open position, the elastic element is relaxed, and the trap is in a stable equilibrium, and in the closed position, the elastic element is strained, and the trap is in an unstable equilibrium.

In certain embodiments, the actuator comprises a motor (118) that drives a crank (121), wherein the crank (121) is connected to the connecting mechanism. In further embodiments, the connecting mechanism is chosen from a list comprising cables (125) and connecting rods (120).

In certain embodiments, the connecting mechanism comprises a connecting rod (120), and the connecting rod (120) comprises a slot (122) through which a shaft (114) that is connected to the crank (121) slides.

In certain embodiments, the actuator is removable from the trap.

In certain embodiments of the trap (100) according to the invention, the receptacle (200) comprises a fluid.

In certain embodiments of the trap (100), the cover (210) is rotatably connected to the receptacle (200) by means of hinges (140).

In certain embodiments of the trap (100), the cover (210) is rotatably connected to the receptacle (200) by means of a flexible strip, the flexible strip acting as an elastic element.

In certain embodiments of the trap (100), the cover (210) is in a substantially horizontal position when the cover (210)

is in the closed position, and the cover (210) is swung into the receptacle (200) when the cover (210) is in the open position.

In certain embodiments of the invention, the trap comprises a seal. In certain embodiments of the invention, the trap (100) comprises a seal (250), wherein the seal (250) is situated between the cover (210) and the receptacle (200) when the cover (210) is in the closed position. In certain embodiments, this seal (250) is made of foam rubber, preferably EPDM foam rubber. In certain embodiments, the seal is a bellows seal.

In certain embodiments of the trap (100), the cover (210) is connected to a perpendicular plate (220) that is at right angles to the cover (210), wherein the perpendicular plate (220) has a shape and a size that substantially correspond to the size and the shape of the cover (210), and wherein the perpendicular plate (220) is positioned such that, when the cover (210) moves from the closed position to the open position, it moves from an upright position to another position that substantially corresponds to the position of the cover (210) in the closed position.

In certain embodiments of the trap (100), the cover (210) rotates on an axis of rotation, wherein the cover (210) is connected to the perpendicular plate (220) at the axis of rotation on which the cover (210) rotates.

In certain embodiments, the trap comprises a windable spring.

In certain embodiments of the trap (100), the actuator is a motor (118). In certain embodiments, the motor is chosen from a 12-volt motor or a stepper motor.

In certain embodiments of the trap (100), the actuator is a motor (118) and the motor (118) is configured to operate at one and only one torque.

In certain embodiments of the trap (100), the actuator comprises a handle (115) for manually setting the trap (100).

In certain embodiments of the trap (100), the trap (100) further comprises an additional sensor that is configured to measure the level of the fluid in the receptacle (200).

In certain embodiments of the trap (100), the trap (100) comprises one or more of the following elements: a camera and an image recognition module; a self-test module for performing diagnostic self-testing; a control module that is configured to hold the cover (210) open for a predetermined time, e.g. 2 to 20, 4 to 12, or 6 to 8 seconds, after a rat has been detected on the cover (210), after which the control module controls the motor (118) so as to move the cover (210) back to the closed position. In certain embodiments, the control module is operatively connected to a communication module that is configured to communicate with an external server. More specifically, the control module is configured to estimate the weight of a captured rat on the basis of the difference in fluid level in the receptacle (200) before and after capture.

In certain embodiments of the trap (100), the trap (100) is further equipped with a weighing system for weighing a feeder.

In certain embodiments of the trap (100), the connecting mechanism is operatively connected to the perpendicular plate (220) and to the crank (121).

In certain embodiments of the trap (100), the elastic element comprises a spring (130), wherein the spring (130) is preferably positioned between the cover (210) and a support block (135) which is mechanically connected to the receptacle (200); wherein the spring (130) is compressed when the cover (210) is in the closed state, and wherein the spring (130) is less compressed or relaxed when the cover (210) is in the open state.

The invention also provides methods for catching vermin such as rats, comprising the following steps:
a) providing a trap (100) comprising a receptacle (200), a cover (210), a sensor (105), an elastic element, and a connecting mechanism between the actuator and the cover (210), wherein the receptacle (200) comprises an opening (260), and wherein the cover (210) is positioned in a closed position such that the cover (210) closes the opening (260), in which the trap (100) is in an unstable equilibrium, and in which the elastic element is strained;
b) attracting a rat;
c) detecting the rat on the cover (210) via the sensor (105);
d) when a rat is detected on the cover (210), relaxing the elastic element, thereby moving the cover (210) from the closed position to an open position, and switching the trap (100) from the unstable equilibrium to a stable equilibrium, thus opening the opening (260) in the receptacle (200) so that the rat falls into the receptacle (200);
e) once the rat has fallen into the receptacle (200), moving the cover (210) from the open position to the closed position by actuating the actuator, thereby straining the elastic element and positioning the trap in the unstable equilibrium.

In certain embodiments of this method, the trap (100) is a trap as described above in one or more embodiments.

In certain embodiments of the method, in step d), the motor (118), with a push, takes the trap (100) out of the unstable equilibrium, wherein the elastic element moves the cover (210) to the open position once the trap (100) has been taken out of the unstable equilibrium by the motor (118).

DESCRIPTION OF THE FIGURES

The following description of the figures is included for illustrative purposes only, and does not limit the subject matter of the present invention in any way.

Figure 1:
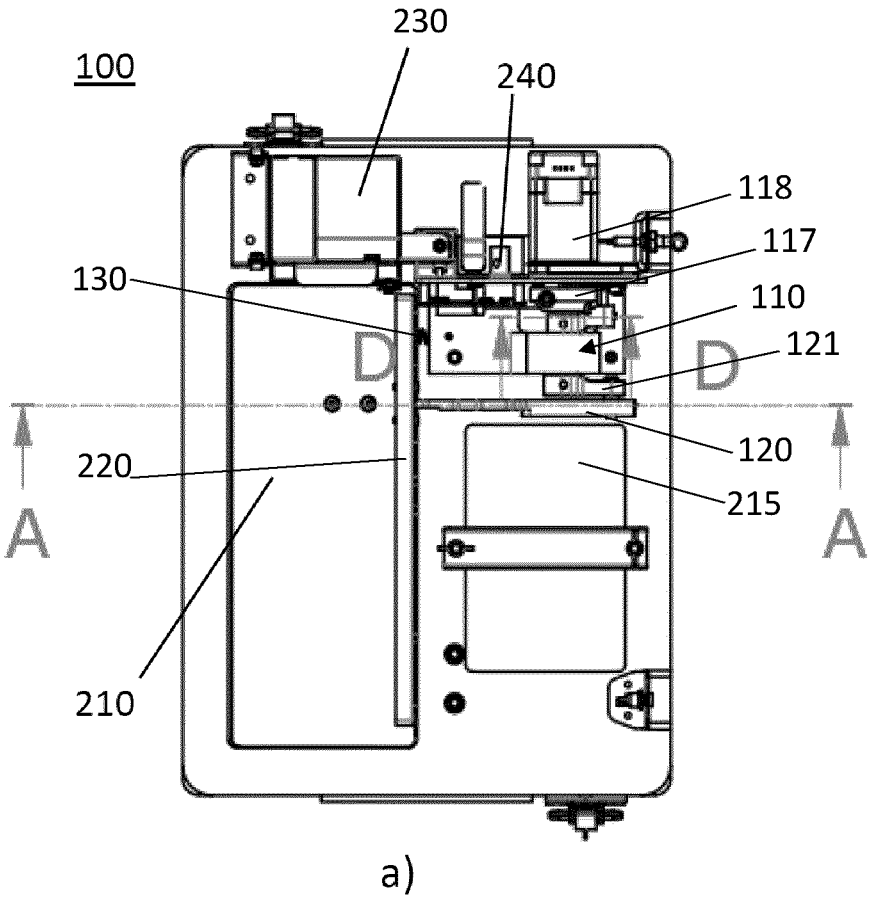
FIG. 1 shows, in panel a), a top view of a trap (100) and, in panel b), a cross-section along line D-D in FIG. 1a) showing a side view of an actuator (110) according to one preferred embodiment of the invention.
Figure 1:
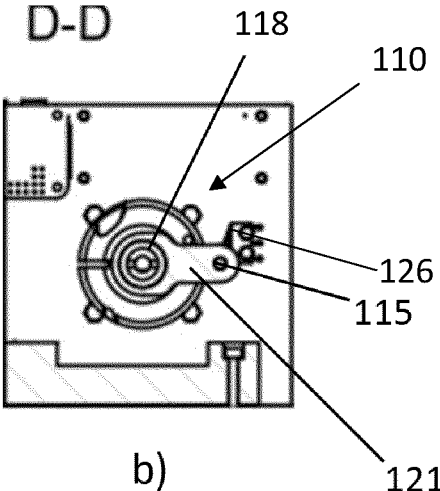
Figure 2:
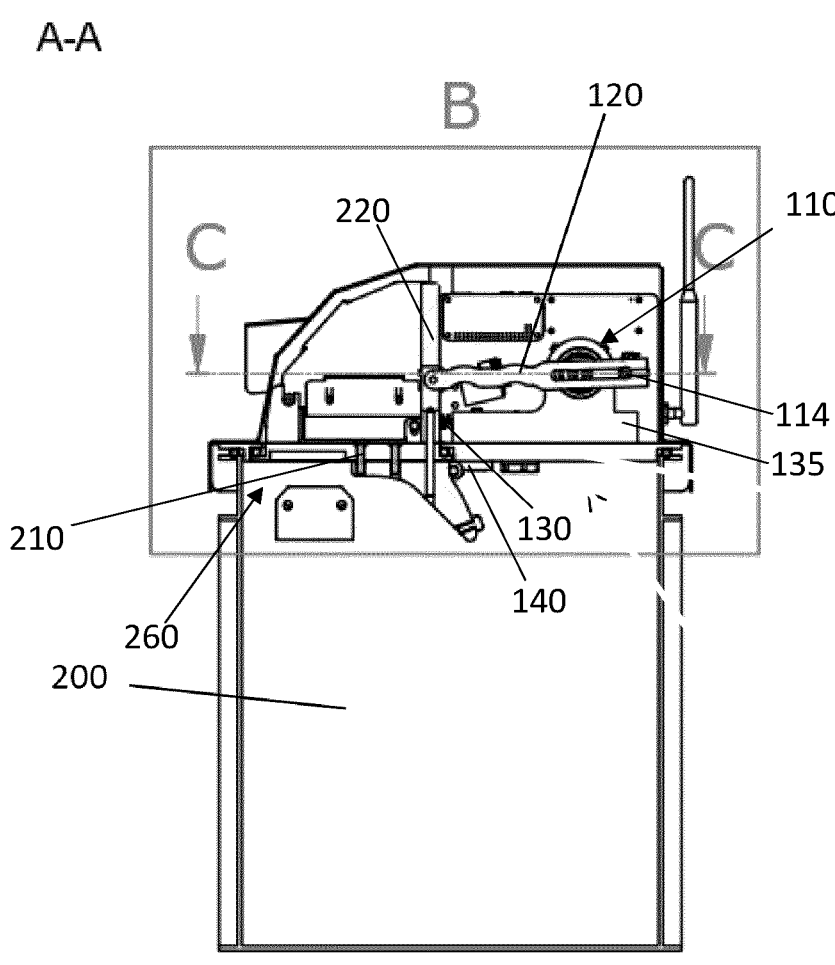
FIG. 2 shows a cross-sectional side view of a trap (100) along line A-A in FIG. 1 a) according to one preferred embodiment of the invention.
Figure 3:
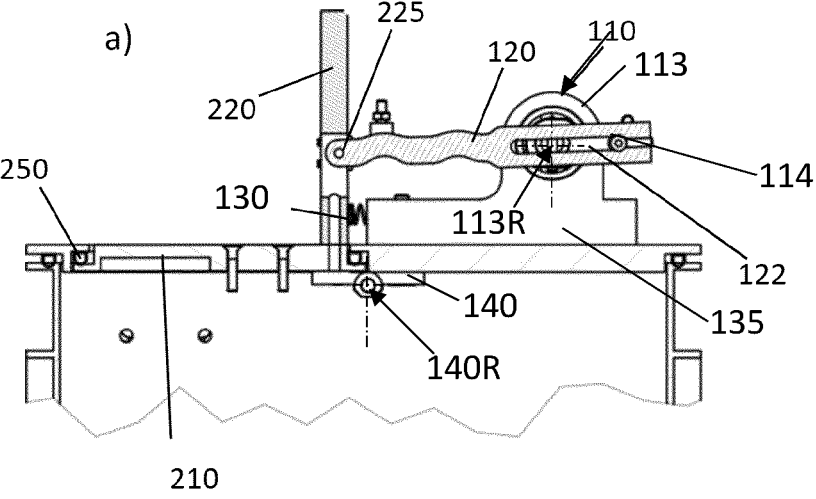
FIG. 3 shows, in panel a), a detail of a cross-sectional side view along line A-A in FIG. 1 a) of the top side of a trap (100) according to one preferred embodiment of the invention, and, in panel b), shows a cross-sectional top view along line C-C in FIG. 2 of the top side of this trap (100).
Figure 3:
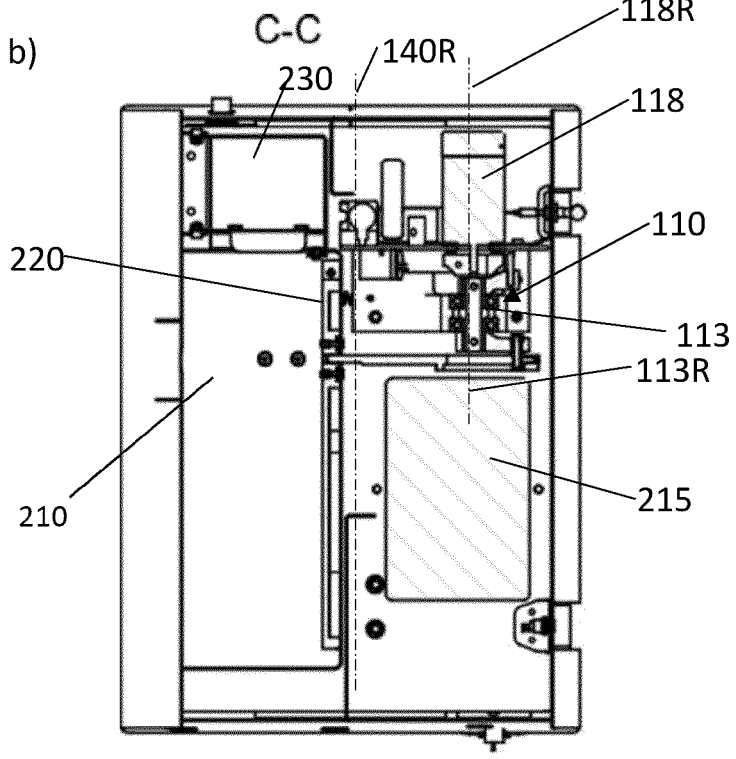

The following numbering is used throughout the figures: 100—trap; 105—sensor; 110—actuator; 113—crank housing; 113R—crank rotational axis; 114—shaft; 115—handle; 116—cable attachment; 117—motor coupler; 118—motor; 118R—motor rotational coupling; 119—motor coupler projection 120—connecting rod; 121—crank; 122—slot; 123—tension clamp; 125—cable; 126—limit marker; 130—spring; 135—support block; 140—hinge; 140R—hinge rotational axis; 150—antenna; 200—receptacle; 210—cover; 215—battery; 216—connector; 220 perpendicular plate; 221—void; 224—opening; 225—connecting rod attachment; 226—cable attachment; 230—feeder; 240—volume sensor; 250—seal; 260—opening in the receptacle.

DETAILED DESCRIPTION

As used hereinbelow in this text, the singular forms "a", "an" and "the" comprise both the singular and the plural, unless the context clearly denotes otherwise.

The terms "comprise", "comprises" as used herein are synonymous with "inclusive", "include" or "contain", "contains" and are inclusive or open, and do not exclude additional items, elements or method steps which have not been mentioned. The terms "comprise", "comprises" are inclusive of the term "contain".

The enumeration of numerical values by means of ranges of figures comprises all values and fractions included in these ranges as well as the cited end points.

The term "approximately" as used when referring to a measurable value, such as a parameter, a quantity, a time period and so on, is intended to include variations of +/−10% or less, preferably +/−5% or less, more preferably +/−1% or less, and still more preferably +/−0.1% or less, of and from the specified value, in so far as the variations are applicable in order to function in the disclosed invention. It should be understood that the value to which the term "approximately" refers per se has also been disclosed.

All documents which are cited in the present specification are incorporated herein in full by way of reference.

Unless otherwise defined, all terms disclosed in the invention, including technical and scientific terms, have the meanings which those skilled in the art usually give them. As a further guide, definitions have been incorporated in order to further explain terms which are used in the description of the invention.

Provided herein is a trap for catching vermin, especially rats. For the sake of convenience, reference is always made here to a trap for catching rats. However, it should be understood that the trap and related methods described herein can also be used to catch other rodents, for example mice, moles, and rats.

The trap allows mechanical energy to be stored in an elastic element. This energy can be released momentarily in order to quickly actuate a trapdoor, a cover, from a closed position (in which the trap is in an unstable equilibrium) to an open position (in which the trap is in a stable equilibrium), in order to catch a rat thereby. Thus, with a quick movement of a cover, the trap allows vermin to be caught and then to be shut inside.

The trap comprises an actuator, a receptacle, a cover, a sensor, a feeder, an elastic element, and a connecting mechanism between the actuator and the cover. The presence of the vermin on the cover is detected by the sensor, which via the motor or the windable spring, causes the elastic element to move the cover, resulting in the vermin ending up in the receptacle. By virtue of the optional presence of an additional perpendicular plate, the receptacle is also covered when the cover is in an open position. The mechanism thereof is further described hereinbelow.

The trap comprises a feeder, arranged next to a cover, so that the vermin must set foot on the cover in order to consume feed from the feeder. The term "feeder" also comprises a plate or a slot or other structure on or in which the feeder can be placed. The shape of the feeder is not important in this regard, as long as the feed is accessible to the vermin (the dimensions and arrangement of the feeder can be adapted to the nature of the vermin that it is desired to be caught). The idea is to provide the feeder with suitable feed or other bait to attract the vermin. In certain embodiments, the feeder is provided with a store, in which feed can be stored and from which feed can be guided to the feeder. In certain embodiments, the store includes a mechanism that can provide feed to the feeder in a controlled manner. In certain embodiments, the feeder is further provided with a sensor, such as for example a weight sensor, by means of which it is possible to measure how much feed is present in the feeder.

The receptacle of the trap comprises an opening, and may take any of a number of shapes. For example, the receptacle is cuboid in shape and the receptacle further has a bottom and a plurality of walls. In this case, the opening is situated in a top wall. The opening can be closed by means of a cover. Preferably, the size of the cover corresponds to that of the opening so that the cover can move through the opening into the interior of the receptacle.

The cover is rotatably arranged on an edge of the opening of the receptacle. In particular, the cover is rotatable between an open position and a closed position. Preferably, the cover is in a substantially horizontal position when the cover is in the closed position, and the cover is swung into the receptacle when the cover is in the open position. Preferably, this movement comprises a rotation by at least 30 degrees, at least 45 degrees, and preferably between 70 and 100 degrees, such as for example 90 degrees.

In some embodiments, the cover is rotatably connected to the receptacle by means of hinges. Alternatively, the cover is rotatably connected to the receptacle by means of a flexible strip. In such embodiments, the flexible strip acts as an elastic element.

In the closed position, the cover closes the opening in the receptacle.

When the cover is in the open position, it does not close the receptacle and the cover is swung into the receptacle. Preferably, the cover has a substantially vertical orientation in the open position. As discussed hereinbelow, an "open" position of the cover does not necessarily mean that the receptacle per se is accessible, as it can then be closed by a plate which, when the cover is rotated, closes the opening.

The actuator is controlled by the sensor, which detects the presence of the vermin in the trap, more specifically on the cover at the feeder. In some embodiments, the sensor is a weight sensor or a motion sensor, such as a PIR (passive infrared sensor).

The actuator is operatively connected to the cover and the actuator is configured to move the cover from the open position to the closed position. During this movement, the elastic element is strained. A suitable actuator is, for example, an automatic actuator such as a motor, or a manual actuator such as a handle connected to a crank.

The actuator is preferably removable from the trap. This makes the trap easier to assemble, maintain, and clean.

In some embodiments, the trap, and in particular the actuator, comprises a motor, for example a 12-volt motor or a stepper motor. Preferably, the motor is configured to operate at one and only one torque. Such motors are simple in construction and are therefore inexpensive. Indeed, it is one of the advantages of the present trap that such a simple motor can be used.

In some embodiments, the motor is configured to operate at one and only one speed and one and only one torque.

The motor drives a crank. The crank is connected to a connecting mechanism. Suitable connecting mechanisms are cables and connecting rods. When a connecting rod is used as the connecting mechanism, the connecting rod then optionally comprises a slot through which a shaft that is connected to the crank slides. A connection is thus established between the connecting rod and crank. In these embodiments, the stable and unstable equilibria of the trap correspond to the dead centers of the crank-connecting rod mechanism.

In some embodiments, when a cable is used as the connecting mechanism, the cable is connected to the cover via a perpendicular plate with one cable attachment, and to the crank with another cable attachment.

In some embodiments, the actuator comprises a handle for manually setting the trap. The handle can be used on its own or in combination with a motor. When the handle is used without a motor, a user must then reset the trap each time it has been triggered. When the handle is used in combination with a motor, the handle can be used as a redundant setting system. For example, an operator can then still set the trap using the handle if the motor has failed.

The present trap has low power consumption. This is especially the case when a small, simple motor is used. Such motors are relatively slow, but by means of the elastic element the cover can still be opened quickly to catch a rat.

The cover is connected to a perpendicular plate. The perpendicular plate is at right angles to the cover, and the perpendicular plate preferably has a shape and size that substantially correspond to the size and shape of the cover. In addition, the perpendicular plate is positioned such that, when the cover moves from the closed position to the open position, it moves from an upright position to another position that substantially corresponds to the position of the cover in the closed position. In this way the risk of the rat being able to escape once caught is reduced.

In some embodiments, the cover rotates on an axis of rotation, and the cover is connected to the perpendicular plate at the axis of rotation on which the cover rotates.

In some embodiments, the sensor that detects the presence of the rat in the trap is a motion sensor. In more specific embodiments, the motion sensor is arranged at the motor. When the motion sensor is positioned on the other side of the perpendicular plate than the side of the cover, the perpendicular plate includes a void to allow detection of the rodent on the cover. Preferably, the sensor is positioned in the trap at the feeder. In certain embodiments, the void in the perpendicular plate is then also at the feeder.

As mentioned previously, the cover is connected to the actuator via a connecting mechanism. Preferably, the connecting mechanism is operatively connected to the perpendicular plate and to the crank. In this case, the trap is set via a crank connected to a connecting mechanism.

Suitable connecting mechanisms comprise elongate objects such as connecting rods and cables.

Thus, in certain embodiments, a connecting rod is used as the connecting mechanism. The connecting rod preferably comprises a slot. The slot allows rigidity to be created in one direction.

The elastic element is configured to move the cover from the closed position to the open position. This movement happens suddenly and allows a rat to be caught in the receptacle.

Note that, in the closed position, the elastic object is strained, and the trap is in an unstable equilibrium. Conversely, the elastic element is relaxed in the open position, and the trap is then in a stable equilibrium. Thus, mechanical energy stored in the strained elastic object is used to move the cover from the closed position to the open position, allowing a rat situated on the cover to be caught. Thus, by virtue of the elastic element, the trap can transition from the closed position to the open position very efficiently.

In some embodiments, the elastic element comprises or is a spring. Preferably, the spring is positioned between the cover and a support block which is mechanically connected to the receptacle. In this case, the spring is compressed and the spring is strained in the closed position, and the spring is less compressed or at rest in the open position. The spring strain can hereby be adjusted by using another spring of different spring constant or by adjusting the preload length. In some embodiments, the elastic element is a continuous elastic connection between the cover and the receptacle.

In some embodiments, the receptacle comprises a fluid. The fluid allows the catch to be drowned and thus neutralized. Many different fluids are suitable. Examples of a suitable fluid is a mixture of isopropyl alcohol, oil and water. This mixture also allows the catch to be preserved for a long time and unpleasant odors to be prevented.

In certain embodiments, the trap also comprises a battery that is operatively connected to the motor. Additionally or alternatively, the trap is also provided with a connector for connection to the grid.

In some embodiments, the trap further comprises a walkway that facilitates access to the cover and the feeder for the vermin. For example, when the trap is on the ground and the cover of the receptacle is located some distance off the ground, and the vermin will not move onto the cover of the receptacle by itself, a walkway can be placed between the ground and the cover. One particular embodiment of a walkway is an inclined plate (with or without side walls) that extends from the bottom of the trap to the cover, with an angle that allows easy access by vermin.

In some embodiments, the trap further comprises an additional sensor that is configured to measure the level of the fluid in the receptacle. By measuring the level of the fluid, an estimate can be made of the volume and/or weight of the animal caught by the trap. For example, the capture of a mouse can be distinguished from the capture of a rat. In addition, the fluid level is directly proportional to the volume of the captured rats. Based on the volume of an average rat, an estimate can be made of the number of rats caught via the rat volume detection system.

In some embodiments, the trap comprises a seal. This seal is positioned around the opening in the receptacle so that the seal is situated between the cover and the receptacle when the cover is in the closed position. In some embodiments, the seal is made of foam rubber, for example EPDM (ethylene propylene diene monomer) foam rubber. The seal allows nuisance odor from neutralized catch to be prevented.

In some embodiments, the trap further comprises a camera and an image recognition module. Preferably, the image recognition module is configured to detect what type of animal is on the cover. In addition, the image recognition module is preferably operatively connected to a memory module that comprises a database containing a list of different animals which are divided into target catch and bycatch. In these embodiments, the trap is configured to spring only when an animal classified as the target catch is on the cover. Bycatch can thus be avoided.

In some embodiments, the trap comprises a control module that is configured to hold the cover open for a predetermined time, e.g. 2 to 20, 4 to 12, or 6 to 8 seconds, after a rat has been detected on the cover. After this predetermined time, the control module controls the motor so as to move the cover back to the closed position.

In certain embodiments, the control module is configured to estimate the weight of a captured rat on the basis of the difference in fluid level in the receptacle before and after capture.

In certain embodiments, the control module is configured to estimate the weight of a captured animal on the basis of the difference in fluid level in the receptacle before and after capture. In some embodiments, a catch weighing less than 50 grams is categorized as a mouse, and a catch weighing more than 50 grams is categorized as a rat. A memory module that is operatively connected to the control module is preferably configured to keep track of the number of catches in multiple categories, e.g. multiple weight categories.

In some embodiments, the control module is operatively connected to a communication module that is configured to communicate with an external server.

The communication module is preferably configured to transmit the following data to a network: the number of visits of a rat to the trap, the number of rats caught, the weight of the feeder, the volume of the fallen rats, the level of fluid in the receptacle, the status of the battery, the location of the trap, and/or the results of diagnostic self-testing performed by the trap.

In some embodiments, the control module is configured to send a message to a server via the communication module every time there is trap activity. Alternatively, the control module comprises a counter for counting the number of movements of the cover. Ideally, the number of movements of the cover corresponds to the number of captured rats in the trap. An operator can then preferably call up the number of movements of the cover via the communication module, so that the operator can remotely obtain an estimate of how many rats are in the trap.

Alternatively or additionally, the control module can be configured to transmit a signal via the communication module when the cover has performed a certain number of movements. For example, an operator can be notified when the receptacle is almost full, so that the operator can empty the receptacle in good time.

In some embodiments, the trap further comprises a self-test module for performing diagnostic self-testing.

In some embodiments, the self-test module is configured to detect, using one or more sensors, that the trap is not working, i.e. that the trap is stuck. In this case, the self-test module sends a "trap stuck" signal to a user using the communication module. The user can then deduce that a piece of food is probably blocking the closing mechanism.

Another example of the operation of the self-test module comprises detecting multiple calibration attempts that fail. This is an indication that the trap has become deformed. Once the trap has sent a signal to the user, they can pay a maintenance visit to the trap in order to make the trap operational again.

In some embodiments, the trap is further equipped with a weighing system for weighing a feeder. Preferably, this weighing system is calibrated when the trap is set up and/or periodically. In some embodiments, calibration is performed by lifting the feeder off a weight sensor located under the feeder, and measuring the signal from this sensor. Thus, a zero measurement is obtained for calibration.

In some embodiments, the trap comprises multiple sensors, a PCB (printed circuit board), a communication module comprising an antenna, and associated electronics. Preferably, these components and the motor are removable from the trap. Preferably, the trap comprises a motor and various sensors, and the sensors and motor of the trap are contained in a removable module. In these embodiments, a crank-connecting rod mechanism is preferably used. This makes cleaning the trap easier.

In this way, the trap can easily be cleaned.

In some embodiments, the trap comprises a protective housing that comprises one or more components of the trap. In certain embodiments, the motor and crank are enclosed by a housing. In certain embodiments, the entire top of the trap (cover, feeder and system of the crank and sensors) is enclosed by a removable housing.

Further provided herein are methods for catching vermin, such as a rat. This method comprises steps a, b, c, d, and e, which are discussed in detail hereinbelow.

Step a) comprises providing a trap. The trap comprises a receptacle, a cover, an actuator, a sensor, a feeder, an elastic element, and a connecting mechanism between the actuator and the cover. The receptacle comprises an opening and the cover is positioned in a closed position such that the cover closes the opening. In the open position, the trap is in an unstable equilibrium, and the elastic element is strained.

Preferably, the trap is a trap as described herein.

Step b) comprises attracting a rat. This can be done, for example, using feed, which is placed in a feeder.

In some embodiments, the feeder is provided with a sensor and the feed can be weighed, so that in the absence of feed, the feeder can be replenished in good time.

In some embodiments, the feed is weighed automatically. In this way the trap can start catching without the intervention of an operator.

Step c) comprises detecting the rat on the cover. In some embodiments, this detection is performed by a sensor, for example by a weight sensor or a motion sensor, such as a PIR (passive infrared sensor).

In step d), the trap is triggered when a rat is detected on the cover. In particular, the elastic element is relaxed, and the cover moves from the closed position to an open position. In other words, the cover is swung into the receptacle. In this way the trap then transitions from the unstable equilibrium to a stable equilibrium. The opening in the receptacle is thus opened, and the rat falls into the receptacle. By providing the elastic element, the trap does is not dependent on a motor to provide high acceleration when opening. Thus, the trap has low power consumption and the trap can be provided with an inexpensive motor.

Once the trap has been sprung, the rat is captured in the receptacle. The rat can then be kept alive or neutralized as desired. The use of a fluid in the receptacle is highly suitable for neutralizing a rat: using a liquid, a rat in the receptacle can be drowned efficiently.

In some embodiments, when the trap is triggered, the motor takes the trap out of the unstable equilibrium with a push. The motor is, for example, controlled by a signal from a sensor, for example a PIR sensor. After a push from the motor, the elastic element moves the cover into the open position. In the open position, the cover is swung into the receptacle. It should be understood that, once the motor has given the push, the movement of the cover from the closed position to the open position is driven by the elastic element. In other words, the motor is turned off and/or the motor provides a negligible amount of work in comparison with the elastic element once the motor has given the push to take the trap out of the unstable equilibrium.

Preferably, the rats are lured to the rat trap over a certain period by offering a specified amount of feed before the trap is actually used to catch the rats. This period is, for example, 1 week to 6 months, or 2 weeks to 4 months, or 3 weeks to 3 months, or 1 month to 2 months. Feeding the rats before bringing the trap into operation allows the rats to become familiar with the trap. Experience shows that this increases the effectiveness of the trap in the long run.

Using a single sensor, e.g. a pressure sensor operatively connected to the cover, it is possible to detect whether the trap has been triggered. This sensor can then, via a control module and a communication module, send a signal to an operator so that they are informed that the trap has been triggered. Such an incremental catch signal can, for example, be transmitted when the fluid level sensor detects a change in volume corresponding to between at least 25% and at most 200% of the average volume of a rat. In this way, it is possible to be informed remotely when a rat is caught. Alternatively or additionally, the communication module is configured to transmit a total catch signal once the trap has caught a predetermined volume or number of rats. In this way, it is possible to check remotely whether the trap is full.

Step e) is carried out after the rat has fallen into the receptacle. In particular, in step e), the cover is moved from the open position to the closed position. This is done by actuating the actuator. Thus, the elastic element is strained again, and the trap is placed back in the unstable equilibrium.

The actuator preferably comprises a motor, since this allows the trap to be set automatically. However, operation without a motor is also possible. In this case, the actuator is provided by, for example, a spring-winding mechanism or another energy source.

When the trap comprises a crank-connecting rod mechanism that is driven by a motor, the dead center in the unstable equilibrium of the crank-connecting rod mechanism is simply sought by calibrating or measuring when the motor needs zero force to keep the crank-connecting rod mechanism in place. In certain embodiments, the calibration is performed by turning the motor by one revolution, seeing when the unstable point is reached (trap then goes off) and then letting the motor turn by 1 revolution—a predetermined angle.

This configuration has the advantage that the motor does not require a high torque, and thus an inexpensive motor can be chosen. More specifically, the motor has a torque of at least 25 mNm. Preferably, the motor has a torque of about 45 mNm.

Once the rat has been caught, it is preferably drowned in a fluid. Suitable fluids are, for example, water, oil, and oil-alcohol mixtures. The fluid can comprise one or more phases. Preferably, the density of the fluid is lower than that of water.

Alternatively, the receptacle does not comprise fluid, and the rat is kept alive after capture.

EXAMPLES

The present invention is further illustrated with the aid of the examples below. These examples are included herein only to illustrate certain features and embodiments of the present invention, and are in no way intended to limit the scope of the invention. The numerical references in these examples are illustrated in the figures; however, these embodiments are not to be regarded as limiting.

Example 1

In a first example, traps (100) according to the present invention are discussed, as shown in the figures. These traps (100) comprise a receptacle (200) that comprises a bottom, a plurality of walls, and an opening (260). The opening (260) can be closed by means of a cover (210). The cover (210) is rotatably arranged on the edge of the opening (260) of the receptacle (200) between an open position and a closed position. This rotatable arrangement can, for example, be provided by means of hinges (140) or another type of connection between cover (210) and receptacle (200) that allows rotational movement.

In the closed position, the cover (210) closes the opening (260) in the receptacle (200), and when the cover is in the open position, the opening (260) in the receptacle (200) is open, the cover (210) has a substantially vertical orientation, and the cover (210) is swung into the receptacle (200). In the closed position, the receptacle (200) is hermetically sealed by the cover (210). This is accomplished by means of a seal (250). The seal (250) is made of a soft, flexible material and is pressed between the receptacle (200) and the cover (210) when the cover (210) is in the closed position. The seal (250) is made, for example, of foam rubber. Another name for foam rubber is cellular rubber. One suitable material is in particular EPDM (ethylene propylene diene monomer) foam rubber.

In some embodiments, the trap also comprises a tension clamp (123) for adjusting the tension of the trap so that the seals are properly sealed tight.

The cover (210) is connected to a perpendicular plate (220) that is at right angles to the cover (210). The perpendicular plate (220) has a shape and a size that substantially correspond to the size and shape of the cover (210), with the exception of the opening (224) through which the sensor (205) can detect the presence of the rodent on the cover (210). In addition, the perpendicular plate is positioned such that, when the cover (210) moves from the closed position to the open position, it moves from an upright position to another position that substantially corresponds to the position of the cover (210) in the closed position. In addition, the cover (210) and the perpendicular plate (220) are connected to one another at the axis of rotation on which the cover rotates when moving between the open position and the closed position. Providing a cover (210) and a perpendicular plate (220) that are connected to one another ensures that when the cover tilts from the closed to the open position, the perpendicular plate (220) also tilts and thus pushes a rat down into the receptacle (200). This gives the rat fewer possibilities to escape. When the cover (210) is tilted downward, the perpendicular plate (220) covers the opening (260)

which, when the cover is in the closed position, is sealed off by the cover. Thus, even if the rat initially had the strength to move toward the opening (260), this opening (260) is sealed off by the perpendicular plate (220), thus trapping the rat. The traps (100) comprise an actuator (110). The actuator comprises a motor (118) and/or a handle (115). The motor (118) is a stepper motor or 12-volt motor/reducer. Preferably, the motor (118) is configured to operate at one and only one speed and one and only one torque. Such motors have the advantage of being simple in construction, inexpensive, and having low power consumption. A fast, high-torque motor (118) such as a servo motor is not needed in the trap (100) according to the present invention because the trap (100) can be triggered quickly via energy stored in an elastic element (130), discussed in more detail further below.

Figure 4:
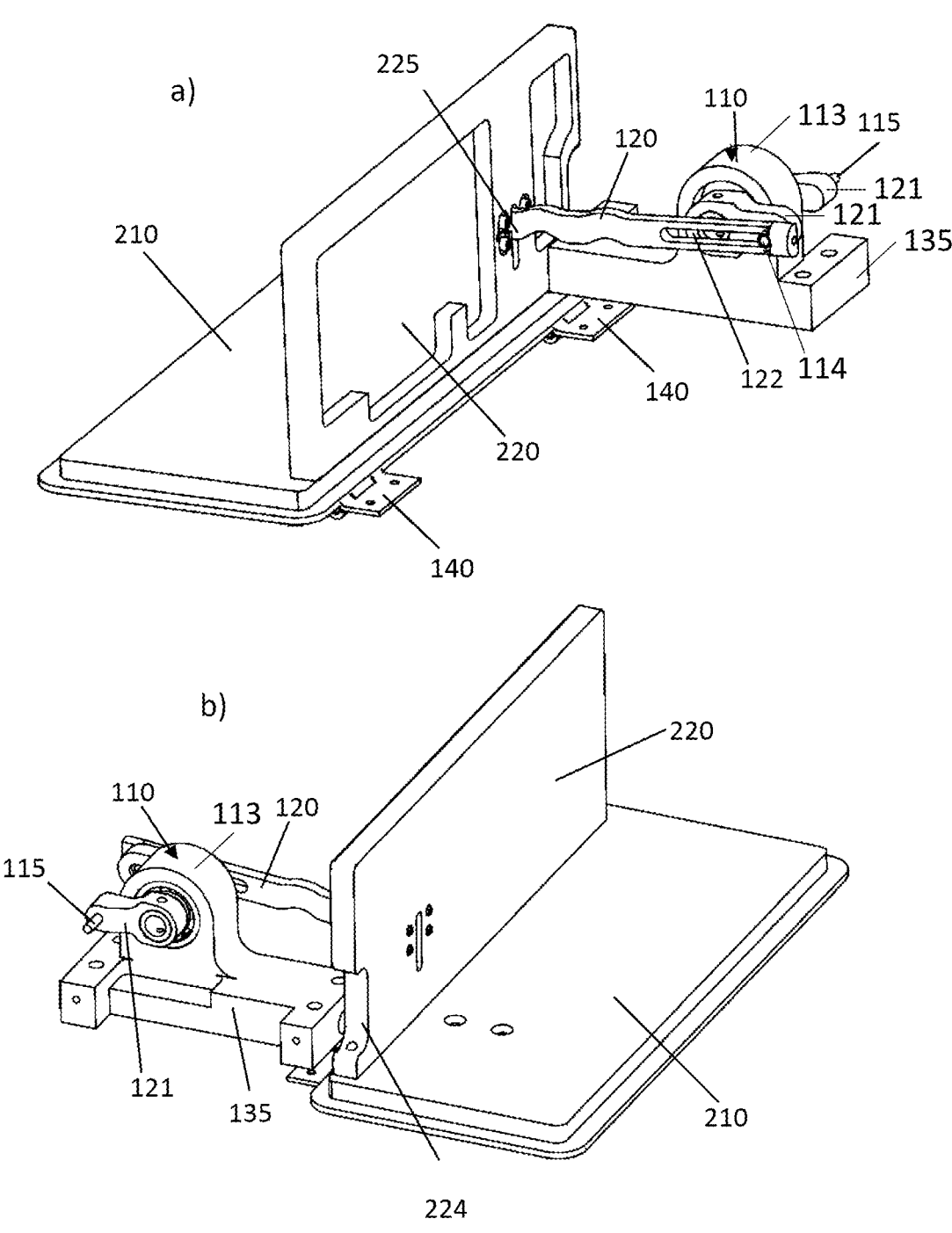
FIG. 4 shows, in panels a) and b), two views of an actuator (110), a handle (115), a rod (120), a perpendicular plate (220) with an opening (224), and a cover (210) according to one preferred embodiment of the invention. These two panels show the configuration of these components in the closed position of the cover (210).
Figure 5:
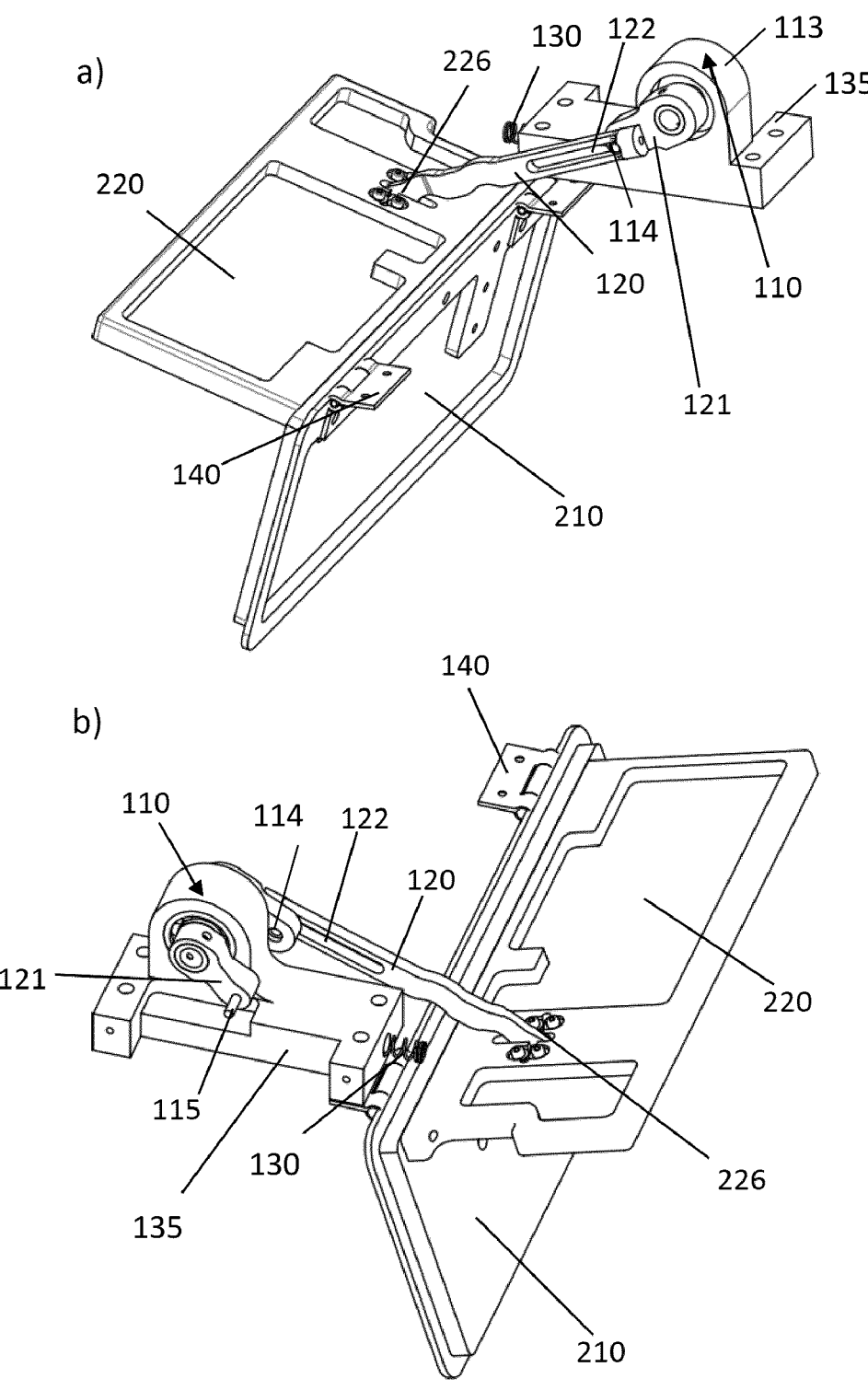
FIG. 5 shows, in panels a) and b), two views of a motor (118), a handle (115), a rod (120), a perpendicular plate (220), and a cover (210) according to one preferred embodiment of the invention. These two panels show the configuration of these components in the open position of the cover (210).
Figure 6:
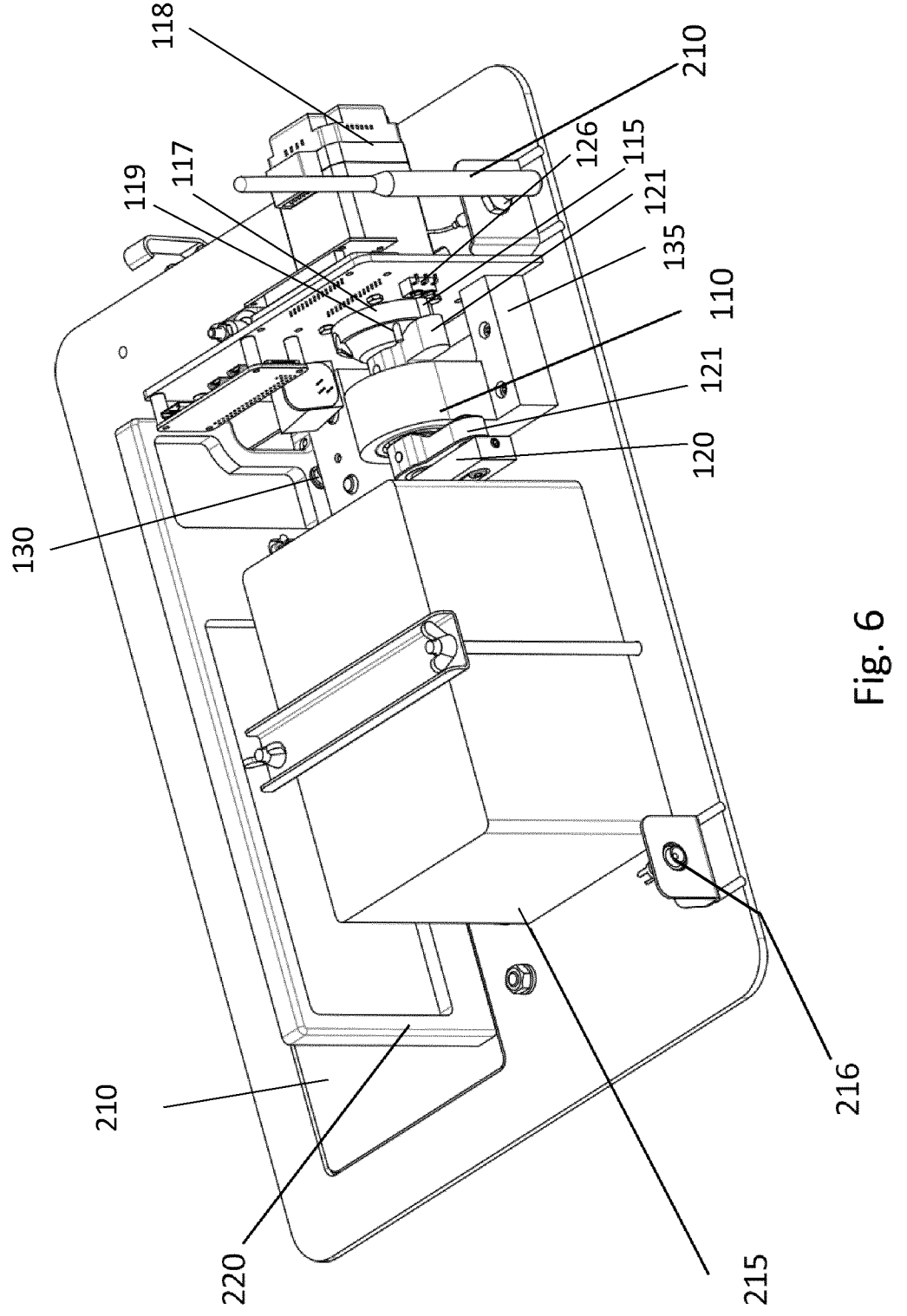
FIG. 6 shows a top view of various components located at the top of the trap (100) according to one preferred embodiment of the invention.
Figure 7:
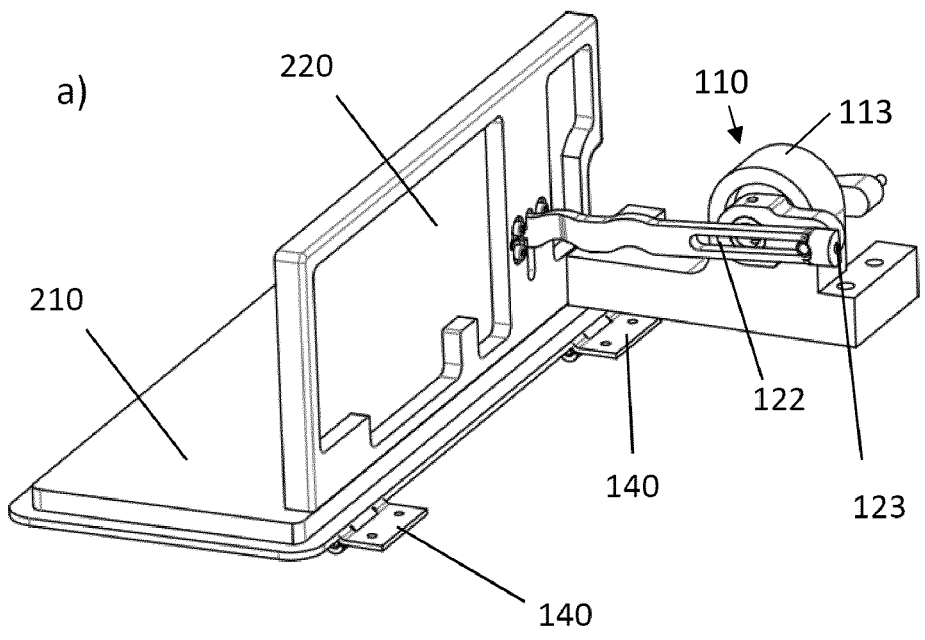
FIG. 7 shows, in panels a) and b), a perspective view of some components of a trap (100) according to one preferred embodiment of the invention.
Figure 7:
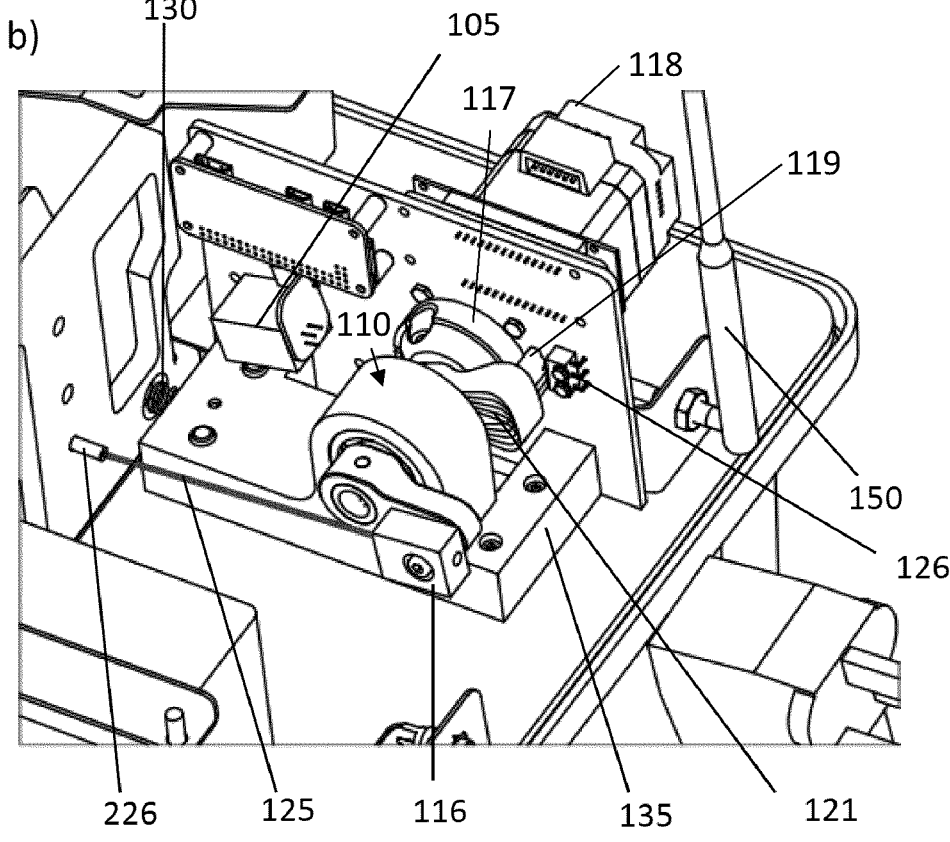

The traps (100) also comprise a sensor (105) at the feeder which is connected to the motor (118) and detects the presence of vermin on the cover (210). In the embodiment illustrated in FIG. 4, the perpendicular plate includes a void (221), which allows a PIR sensor that is positioned on the other side of the plate (220) to the motor (118) to detect the presence of an animal on the cover. The trap (100) is set via a crank (121) connected to a connecting mechanism. Suitable connecting mechanisms comprise elongate objects such as connecting rods (120) and cables (125). When a connecting rod (120) is used, it preferably has a slot (122). The connecting mechanism provides an operative connection between the crank (121) and the cover (210). The cover (210) can be moved from an open position to a closed position by means of the actuator (110) and the connecting mechanism. This movement may take place slowly, so it is sufficient to provide a small, simple motor (118) as an actuator. Alternatively, the movement of the cover (210) from the open to the closed position can also be performed manually. In this case, an operator uses, for example, a handle (115) that is connected to the crank (121).

When a cable (125) is used as the elongate object in the connection, the cable (125) is connected to the perpendicular plate (220) with one cable attachment (226) and to the crank (121) with another cable attachment (116).

Additionally, the traps (100) also comprise an elastic element. One suitable elastic element is a spring (130). Alternatively, a continuous elastic connection can be provided between the cover (210) and the receptacle (200). As shown in the figures, the elastic element is a spring (130) that is clamped between the cover (210) and a support block (135) which is mechanically connected to the receptacle (200). When the cover (210) is in the closed position, the spring (130) is compressed and the trap (100) is set. When the cover (210) is in the open position, the spring (130) is less compressed or even at rest, and the trap (100) has been sprung, as it were. The elastic element allows the cover (210) to move from the closed position to the open position very quickly.

Indeed, when the actuator (110) moves the cover (210) from the open position to the closed position, mechanical energy is stored in the elastic element. In the closed position, the trap (100) is in an unstable equilibrium. No force is then required to keep the trap (100) in this position. However, only a small force is needed to leave this unstable equilibrium. This small force can be applied by the motor (118) on detecting a rat on the cover (210) by means of the sensor.

Alternatively, vibrations from a rat on the cover (210) can be used to take the trap (100) out of the unstable equilibrium. Indeed, vibrations from the rat on the cover (210) are then transmitted from the cover (210) to the perpendicular plate (220), to the connecting mechanism, to the crank (121) and finally to the motor (118), if present. If a motor (118) is present, then the weight of the rat, and associated vibrations, can be used as a trigger for the motor (118) to take the trap (100) out of the unstable equilibrium.

Thus, when a rat is on the cover (210), the cover (210) moves from the closed position to the open position. The rat then falls into the receptacle (200). The rat can potentially be kept alive there, or it can be drowned in a fluid such as water or oil.

The trap (100) comprises a tension clamp (123) for adjusting the tension of the trap so that the rubber seals are properly sealed tight.

The trap also comprises a battery (215) that is operatively connected to the motor and a connector (216) for connection to the grid.

The trap (100) comprises an additional sensor that is configured to measure the level of the fluid in the receptacle (200). By measuring the level of the fluid, an estimate can be made of the volume and/or weight of the animal caught by the trap (100). The volume of a weight caught corresponds to the volume of the fluid displaced in the receptacle (200), as measured by a volume sensor (240). Thus, the capture of a mouse can be distinguished from the capture of a rat. Relating the level of the fluid to the category of the animal can thus allow an accurate count of the number of rats caught, and this can then be consulted remotely when a communication module is also present in the trap (100). In addition it is possible, independently of the weight of the animals caught, to accurately determine when the receptacle (200) is full and the trap needs maintenance.

Optionally, the trap (100) comprises a camera and an image recognition module. The image recognition module is configured to detect what type of animal is on the cover (210), and is operatively connected to a memory module that comprises a database containing a list of different animals which are divided into target catch and bycatch. By allowing the trap (100) to be triggered only when there is an animal classified as the target catch on the cover (210), bycatch can be avoided. In some embodiments, the trap (100) comprises additional sensors, a PCB (printed circuit board), a communication module comprising an antenna (150), and associated electronics. Preferably, these components and the motor (118) are removable from the trap (100). In this way, the trap (100) can easily be cleaned. The communication module is preferably configured to transmit the following data to a network: the number of visits of a rat to the trap (100), the number of rats caught, the weight of the feeder (230), the volume of the fallen rats, the location of the trap (100), and the results of diagnostic self-testing performed by the trap (100).

The present trap (100) thus has a simple mechanism, a fast-moving cover (210) that acts as a trapdoor, and a mechanism for pressing seals (250) between the receptacle (200) and the cover (210) in order to prevent nuisance odor.

The trap (100) further comprises a self-test module for performing diagnostic self-testing. For example, when the self-test module detects, using one or more sensors, that the trap (100) is not working, the self-test module sends a corresponding signal to a user using the communication module. The user can then deduce that a piece of food is probably blocking the closing mechanism. Another example of the operation of the self-test module comprises detecting multiple calibration attempts that fail. This is an indication that the trap (100) has become deformed. Once the trap (100) has sent a corresponding signal to the user, they can pay a maintenance visit to the trap (100) in order to make the trap (100) operational again.

The trap (100) further comprises a control module that is configured to hold the cover (210) open for a predetermined time, e.g. 2 to 20, 4 to 12, or 6 to 8 seconds, after which the control module controls the motor (118) so as to move the cover (210) back to the closed position.

The control module is further operatively connected to the communication module. The communication module is preferably configured to communicate with an external server. In some embodiments, the control module is configured to send a message to a server via the communication module every time there is trap (100) activity. Alternatively, the control module comprises a counter for counting the number of movements of the cover (210). Ideally, the number of movements of the cover (210) corresponds to the number of captured rats in the trap (100). An operator can then preferably call up the number of movements of the cover via the communication module, so that the operator can remotely obtain an estimate of how many rats are in the trap (100). Alternatively or additionally, the control module can be configured to transmit a signal via the communication module when the cover (210) has performed a certain number of movements. For example, an operator can be notified when the receptacle (200) is almost full, so that the operator can empty the receptacle (200) in good time.

In addition, the control module is configured to estimate the weight of a captured animal on the basis of the difference in fluid level in the receptacle (200) before and after capture. In some embodiments, a catch weighing less than 50 grams is categorized as a mouse, and a catch weighing more than 50 grams is categorized as a rat. A memory module that is operatively connected to the control module is configured to keep track of the number of catches in multiple categories, e.g. multiple weight categories.

In addition, the trap (100) of the present example is very simple in construction. In particular, the following functionality can be provided with only one rotary movement and one on-off sensor:

- one sensor is sufficient to detect that the trap (100) has been triggered. During the triggering of the trap (100) the motor (118) does not operate, or at most the motor (118) operates briefly to take the actuator out of the unstable equilibrium.
- the automatic returning of the trap (100) to the closed position where the dead center is. When the actuator is at dead center, the trap is set.
- the pressuring of the seals (250). This is done by pushing the cover (210) against the seals (250) at the edges of the opening (260) in the receptacle (200).
- the performing of a calibration of the weight measurement of the feeder (230)—this is performed by briefly lifting the feeder (230) off a weight sensor, thus obtaining a zero measurement for calibration;
- the finding of the dead center, that is the unstable equilibrium point, of the actuator;
- the testing of whether the trap (100) is functional.

Example 2

By way of further example, a method for catching a rat is discussed. In this method, a trap (100) according to example 1 is used.

The method comprises attracting a rat. This can be done, for example, using feed. Typically, the rats are lured to the trap (100) over a certain period by offering a specified amount of feed before the trap (100) is actually used to catch the rats. The feed is preferably weighed automatically. In this way the trap (100) can start catching without the intervention of a person. In addition, feeding the rats before bringing the trap into operation allows the rats to become familiar with the trap (100). Experience shows that this increases the effectiveness of the trap (100) in the long run.

When the rat crawls onto the cover (210), this is detected by the sensor. The sensor then actuates the motor (118) which then gives the crank (121) a small push so that the trap (100) leaves the unstable equilibrium. As a result, the elastic element relaxes and the cover (210) moves from the closed position to an open position in which the cover (210) is swung into the receptacle (200). This causes the rat to fall into the receptacle (200). The rat is thus caught. Note that during the triggering of the trap (100) itself, the motor (118) does not operate. At most, the motor (118) will operate briefly when a rat is detected on the cover (210) in order to take the trap (100) out of the unstable equilibrium.

Using a single sensor, e.g. a pressure sensor operatively connected to the cover (210), it is possible to detect whether the trap (100) has been triggered.

Note that the cover (210), also called the trapdoor, of the present trap (100) can be opened very quickly in order to catch vermin. This is accomplished by preloading an elastic element. The elastic element is, for example, a spring (130) or a flexible connection between the cover (210) and the edge of the opening (260) in the receptacle (200). By providing the elastic element, the trap is not dependent on a motor (118) to provide high acceleration when opening. Thus, the trap (100) has low power consumption and the trap (100) can be provided with an inexpensive motor (118).

The trap (100) preferably comprises a motor (118), since this allows the trap to be set automatically. However, operation without a motor (118) is also possible. In this case, the actuator is provided by a spring-winding mechanism or another energy source. A suitable spring-winding mechanism comprises a handle (115) that is connected to a crank (121). The handle (115) allows a user to place the trap (100) in an unstable equilibrium in which the cover (210) is closed. Vibrations caused by a rat or other rodent crawling on the cover (210) are then enough to trigger the trap (100), i.e. to take the trap (100) out of the unstable equilibrium, so that the trap then automatically moves toward the stable equilibrium, and the cover (210) is swung into the trap (100).

Once the rat has been caught, it is preferably drowned in a fluid. Suitable fluids are, for example, water, oil, and oil-alcohol mixtures. The fluid can comprise one or more phases. Preferably, the density of the fluid is lower than that of water so that a captured rat cannot float or floats less well and is thus neutralized more quickly. In addition, when the fluid comprises alcohol, the vermin are intoxicated, so that this process is also painless. The resulting cadaver is held safely and compactly in the receptacle (200).

Once the rat has been caught, the cover (210) is moved from the open position to the closed position by actuating the actuator. Preferably, the motor (118) is actuated automatically once a rat has fallen, but optionally can be actuated manually using a handle (115) and a rotating attachment point. The cover (210) is thus pressed against the seals (250), preferably with a large force. Thus, the trap (100) is again placed in an unstable equilibrium, that is in the unstable dead center of the crank-connecting rod mechanism, and is ready to catch another rat. In other words, the trap (100) is reset by the motor (118) after catching a rat.

The dead center is determined in a calibration cycle by determining the position of the motor up to which the stable point remains. When the unstable point is reached, turning is stopped a few steps before, and this is taken as the dead center. In some embodiments, the trap also comprises a limit marker (126), which defines a fixed zero position for the motor and thus provides a fixed reference position for the dead center. According to an alternative embodiment this limit marker (126) for example comprises a sensor for detecting when the crank (121) has been rotated to a suitable position at, or just before the dead center. such that for example the motor can be controlled, for example by means of the control module, to stop at that position as described above to place the trap (100) again in the unstable equilibrium, such that it is ready to catch another rat. According to a particular example this sensor (126) could for example be embodied as a mechanical switch, a proximity sensor, an optical sensor, and/or any other suitable sensor configured to detect the specific position of the crank arm 121, handle 115, and/or any other suitable element to provide a suitable signal to the control module such that the motor (118) stops the actuator (110) at or at a suitable distance before the dead end, such as for example described above.

The receptacle (200) comprises a fluid and the trap (100) comprises a rat volume detection system. Preferably, the rat volume detection system comprises a fluid level sensor. The fluid level is directly proportional to the volume of the captured rats. Based on the volume of an average rat, an estimate can also be made of the number of rats caught via the rat volume detection system.

The trap (100) further comprises a communication module. The communication module is configured to transmit a total catch signal once the trap (100) has caught a predetermined volume or number of rats. In this way, it is possible to check remotely whether the trap is full. Optionally, the communication module is configured to transmit an incremental catch signal when a specified change in volume is detected, e.g. a change in volume that is between 25% and 200% of the average volume of a full-grown rat. In this way, it is possible to be informed remotely when a rat is caught.

In this particular embodiment, the trap (100) is further equipped with a weighing system for weighing the feeder (230). The weight thus measured can be sent by means of the communication module to a user remotely so that the user knows how much feed is still present in the feeder (230) without having to inspect the trap (100) in person. This weighing system can be calibrated when the trap (100) is set up and/or periodically. Calibration is performed by lifting the feeder (230) off a weight sensor located under the feeder (230), and measuring the signal from this sensor. Thus, a zero measurement is obtained for calibration.

Figure 8:
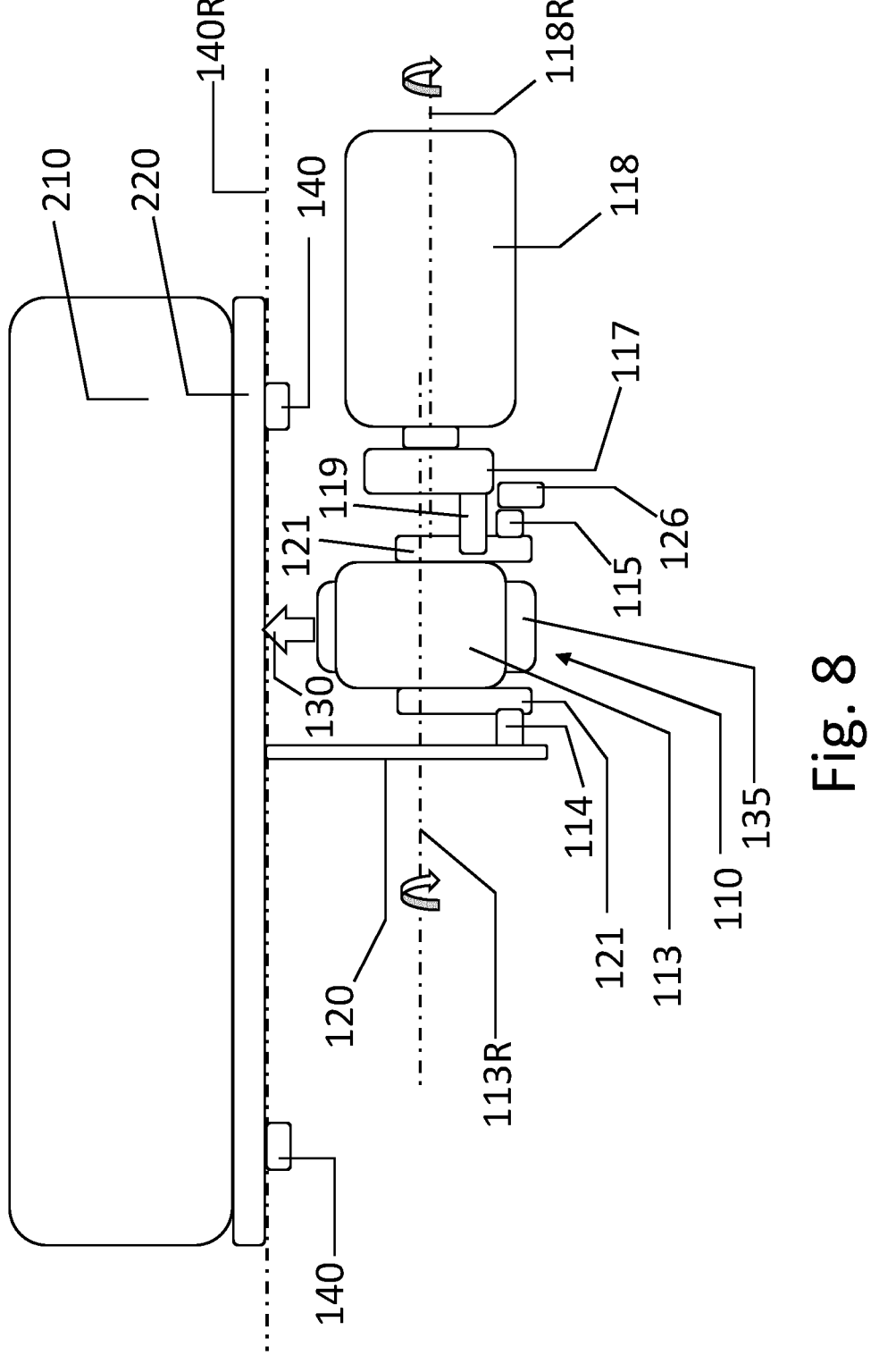
FIG. 8 shows a schematic top view of some components of a trap (100) according to an embodiment of a trap similar to FIGS. 1 to 6.

FIG. 8 schematically shows a top view of an embodiment similar to the embodiment of FIGS. 1-6. Similar features have been referenced by means of similar reference numbers and generally function in a similar way as described above. According to the embodiment of the trap (100) shown, the actuator (110) comprises, similar as shown above, comprises at least one crank (121) that is rotatably arranged for eccentric rotation about a crank rotational axis (113R), as for example determined by means of a suitable bearing housed in a suitable crank housing (113) which is mounted to the frame of the trap (100). As show, according to this embodiment, the actuator (110) comprises two similar cranks (121) arranged at both sides of the crank housing (113) when seen along the direction of the crank rotational axis (113R). It is clear that, the crank (121) of the actuator (110) is coupled via the perpendicular plate (220) to the cover (210) in such a way that the crank rotational axis (113R) and the hinge rotational axis (140R) of the hinges (140) are different. As shown, this means that there is a predetermined minimum distance between the crank rotational axis (113R) and the hinge rotational axis (140R). Thus use of such a connection mechanism comprising for example connecting rod (120) or alternatively cable (126), provides for the benefit that this rotational hinge axis (140R) and the crank rotational axis (113R) do not need to be aligned with a high level of precision. In this way the mounting of the actuator (110) can be performed efficiently and robustly without the need for the use of complex parts and/or mounting means that need to ensure a high level of precision and/or precise tolerances. Further, according to the embodiment shown, and as detailed in the schematic of FIG. 8. The motor (118) of the actuator (110) is releasably coupled to the crank (121) by means of a suitable motor coupler (117). According to the embodiment shown, the motor coupler (117) is configured to releasably couple the drive shaft of the motor (118) to the crank (121) at the side of the crank housing 113 facing the motor (113). According to the state shown in FIG. 8, which corresponds to the state of the trap (100), in which the cover (210) is held in a closed position in an unstable equilibrium, the crank (121) is held in the dead center, or at a predetermined distance before the dead center by a motor coupler projection (120) that projects from the motor coupler (117) in the direction of the crank (121) and is configured to bring and/or hold the crank (121) in this position against the force of the elastic element (130). The force of the elastic element (130), which as described generates a force with a tendency to urge the cover (210) from the closed position to the open position, is schematically shown by means of the arrow (130) in FIG. 8.

Figure 9:
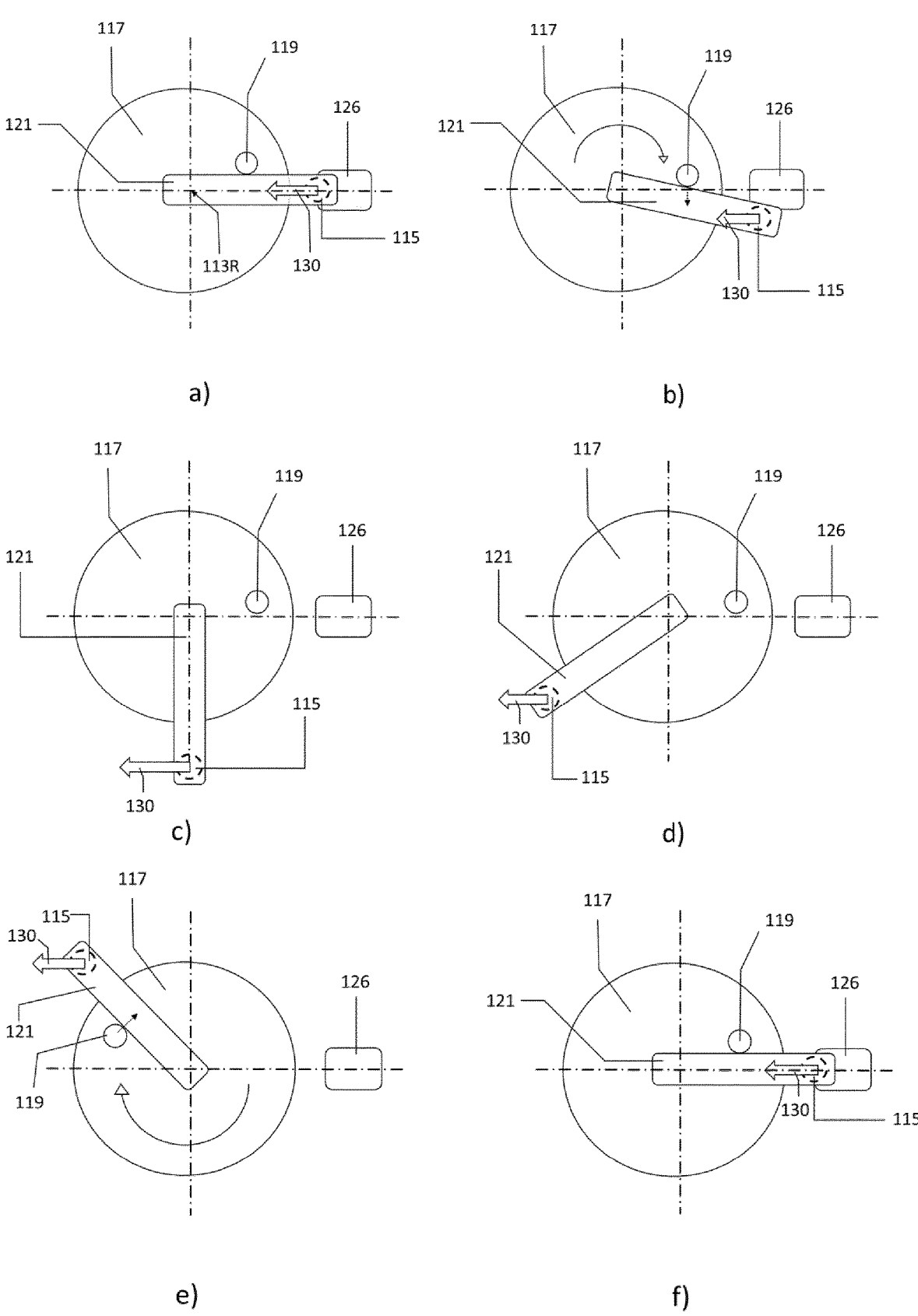
FIG. 9 shows a schematic side view of the embodiment shown in FIG. 8 in during different phases of the method of operation of the trap.

The position shown in FIG. 8, corresponds to the state of the actuator (110) shown in FIG. 9 *a*). As shown the motor coupler projection (119) according to this embodiment, is configured to rotate eccentrically around the crank rotational axis (113R) of the crank arms (121) and abuts in this position on top of the crank arm (121), such that it rests and/or is held into the unstable equilibrium at or near the dead centre. As shown, at or near the dead centre, the force generated by the elastic element (130) is transmitted, for example via the connecting rod (120) and the slot (122) to the shaft (114) and the crank (121) in such a way that this force, represented schematically by arrow (130) points along the longitudinal axis of the crank arm (121) towards the crank rotational axis 113R. It is clear that at or near this dead center position the torque generated by the force of the elastic element (130) is zero or very small, and thus that the motor 118 is able to bring and/or hold the actuator (110) in this position with a minimal energy consumption. As further shown, in FIG. 9 *b*), for example by means of a small push of the motor coupler projection (119) of the motor coupler (117) on the crank (121), for example upon detection of a rat such as described above, the crank (121) is moved from its unstable equilibrium at the dead centre in a direction away from the motor coupler projection (119). As shown the detection of this position, is for example accomplished by means of a suitable mechanical sensor (126), which detects the presence of the crank (121), for example by means of contact with the handle (115) as shown in FIG. 8.

As shown the force acting on the crank (121) represented by arrow (130) and generated by elastic element (130) will start to generate a torque that causes the crank (121) to rotate around the crank rotation axis (113R), thereby moving the cover (210) from the closed position to the open position. As shown in FIG. 9 *c*) and d), and as already explained above, as the movement of the crank (121) is driven by the force of the elastic element (130), it is not necessary for the motor to follow the movement of the crank (121) with the same speed, and as shown the shaft (119) of the motor coupler (117) according to this embodiment no longer remains contact with the crank (121) as the crank (121) rotates in a direction away from the shaft (119) until the closed position of the cover (210) is reached.

Then, as schematically shown in FIG. 9 e), for example after catching a rat, the motor is actuated to reset the trap (100) by moving the cover again from the open position to the closed position by means of the actuator (110). As shown, according to this embodiment the motor (118) is controlled to rotate the motor coupler (117) such that the motor coupler projection (119) is rotated eccentrically around the crank rotational axis (113R) towards the crank (121), for example along the same rotational direction as the crank (121) during the activation of the trap (100). As shown in FIG. 9 e), in this way the motor coupler (117), by means of the motor coupler projection (119) will engage again with the crank (121) in such a way that the motor (118) will start to rotate the crank (121) against the torque generated by the force of the elastic element (130) acting on the crank (121) as represented with arrow (130). This rotation can be continued, such as shown, until the position of FIG. 9 f) is reached, which corresponds with the position of FIG. 9 a), and which can be detected by means of a suitable sensor (126) such as described above, upon which the rotation of the motor can be stopped to hold the crank (121) at or near the dead center in an unstable equilibrium again which the cover (210) of the trap (100) is in the closed state in preparation for a further activation, for example upon detection of a rat.

It is further clear that, as shown in FIG. 8 and as demonstrated by the functional operation shown in FIGS. 9 a)-e), that an embodiment making use of such a motor coupler (117) for releasably coupling the motor (118) to the crank (121) of the actuator, also allows to rotationally couple the motor (118) to the crank (121) in such a way that the motor rotational axis 118R does not need to be exactly aligned with the crank rotational axis 113R. As long as the motor coupler (117) releasably couples the motor (118) in such a way to the crank (121) that the motor is able to rotate the crank (121) during the reset of the trap (100) and optionally to initiate the activation of the trap (100). According to the embodiment shown, this means that the motor coupler projection (119) of the motor coupler (117) is configured to eccentrically rotate about the crank rotational axis (113R) in such a way to releasable engage with the crank (121). As shown in FIG. 8, this allows for some level of misalignment of the motor rotational axis (118R) and the crank rotational axis (113R). Similar as explained above, this provides for the advantage that the motor (118) and motor coupler (117) and optionally any other electronic elements such as for example sensors, the control module, etc. can be easily manufactured and mounted separately from other elements of the actuator such as for example the crank (121), without the need for precise tolerances and/or precise alignment of the different parts during assembly of the trap. The rotational movements of the elements of the actuator (110), especially during actuation of the trap (100) provide for the advantage that a robust operation can be ensured, as there is a reduced risk of blockage and/or operational failure of the actuator at this critical moment of operation of the trap (100). Further it is clear that the control module operating the motor (118) of the actuator can be provided with a very simple control scheme, as for example in the embodiment shown, the motor only needs to be operated in one rotational direction, and only needs to be operated to optionally push the crank (121) out of the unstable equilibrium of the dead end upon activation of the trap, and then only needs to be activated to rotate the crank (121) back until the position of the desired unstable equilibrium is reached again upon which its movement can be stopped. It is further clear, that similar as described above with respect to the crank rotational axis (113R) there is a predetermined minimum distance between the motor rotational axis (118R) and the hinge rotational axis (140R), providing similar advantages as described above.

It is further clear that the actuator (110) comprises only elements configured to perform a rotational movement, such as for example the cranks (121), the motor (118), and preferably the motor coupler (117) releasably coupling the cranks (121) to the motor (118) for rotational movement. In this way the risk for blockage and/or operational failure due translational and/or linear actuators, linear actuators holding the cover (210) in its closed position is overcome.

The invention claimed is:

1. A trap for catching rodents comprising an actuator, a sensor, a receptacle, a cover, a feeder, an elastic element, and a connecting mechanism between the actuator and the cover;
   wherein the receptacle comprises an opening;
   wherein the cover is rotatably arranged on an edge of the opening of the receptacle, wherein the cover is rotatable between an open position and a closed position, wherein the cover closes the opening in the receptacle in the closed position and wherein the opening in the receptacle is not covered by the cover when the cover is in the open position; wherein the actuator is controlled by a signal from the sensor; wherein the actuator is operatively connected to the cover via the connecting mechanism;
   wherein the actuator comprises a motor configured to drive a crank, the crank being connected to the connecting mechanism, and a motor coupler configured to releasably couple the motor to the crank;
   wherein the actuator is configured to move the cover from the open position to the closed position;
   wherein, in the open position, the elastic element is in a relaxed state, and the trap is in a stable equilibrium;
   wherein, in the closed position, the elastic element is in a strained state, and the trap is in an unstable equilibrium; wherein, in the unstable equilibrium, the crank is held in a dead-center position by the motor coupler against a force exerted by the elastic element in the strained state;
   wherein the elastic element is configured to move the cover from the closed position to the open position once the trap is taken out of the unstable equilibrium by a push from the actuator; and
   wherein the motor coupler comprises a motor coupler projection that projects from the motor coupler in a direction toward the crank; wherein the motor coupler projection holds the crank in the unstable equilibrium at or near the dead-center position against the force exerted by the elastic element in the strained state.

2. The trap as claimed in claim 1, wherein the connecting mechanism comprises a cable and/or a connecting rod.

3. The trap as claimed in claim 2, wherein the connecting mechanism comprises a connecting rod, and wherein the connecting rod comprises a slot through which a shaft that is connected to the crank slides.

4. The trap as claimed in claim 1, wherein one or more of the following:
   wherein the actuator is removable,
   and/or
   wherein the receptacle comprises a fluid,
   and/or wherein the cover is rotatably connected to the receptacle by means of hinges, and/or wherein the cover is rotatably connected to the receptacle by means of a flexible strip, the flexible strip acting as the elastic element, and/or wherein the cover is in a substantially horizontal position when the cover is in the closed position, and wherein the cover is swung into the receptacle (200) when the cover is in the open position, and/or wherein the trap comprises a seal, and wherein the seal is situated between the cover and the receptacle when the cover is in the closed position.

5. The trap as claimed in claim 4, wherein the seal is made of foam rubber, and/or wherein the seal is made of EPDM foam rubber, and/or wherein the seal is a bellows seal.

6. The trap as claimed in claim 1, wherein the cover is connected to a perpendicular plate that is at right angles to the cover, wherein the perpendicular plate has a shape and a size that substantially correspond to the size and the shape of the cover, and wherein the perpendicular plate is positioned such that, when the cover moves from the closed position to the open position, the perpendicular plate moves from an upright position to another position that substantially corresponds to the position of the cover in the closed position, and wherein the cover rotates on an axis of rotation, and wherein the cover is connected to the perpendicular plate at the axis of rotation on which the cover rotates.

7. The trap as claimed in claim 1, wherein one or more of the following:

wherein the motor is a 12-volt motor or a stepper motor, and/or wherein the motor is configured to operate at one and only one torque, and/or wherein the actuator comprises a handle for manually setting the trap, and/or wherein the trap further comprises a fluid level sensor that is configured to measure the level of the fluid in the receptacle, and/or wherein the trap further comprises a camera and an image recognition module configured to detect what type of animal is on the cover of the trap, and/or wherein the trap further comprises a self-test module for performing diagnostic self-testing to determine if the trap is operational, and/or wherein the trap further comprises a control module that is configured to hold the cover open for a predetermined time after a rat has been detected on the cover, after which the control module controls the motor so as to move the cover back to the closed position.

8. The trap as claimed in claim 7, wherein the control module is operatively connected to a communication module that is configured to communicate with an external server, and/or wherein the control module is configured to estimate the weight of a captured rat on the basis of the difference in fluid level in the receptacle before and after capture.

9. The trap as claimed in claim 1, wherein the trap is further equipped with a weighing system for weighing the feeder, and/or wherein the connecting mechanism is operatively connected to the perpendicular plate and to the crank, and/or wherein the elastic element comprises a spring, wherein the spring is preferably positioned between the cover and a support block that is mechanically connected to the receptacle; wherein the spring is compressed when the cover is in the closed state, and wherein the spring is less compressed or relaxed when the cover is in the open state.

10. The trap as claimed in claim 1, wherein the trap is further equipped with a limit marker that defines a fixed zero position for the motor and functions to detect the stop position of the crank.

11. The trap as claimed in claim 1, wherein the motor coupler is configured to rotate such that that the motor coupler projection rotates eccentrically about a crank rotational axis; and wherein the motor coupler projection is configured to, in the closed position, abut against the crank so as to hold the crank in the unstable equilibrium at or near the dead-center position.

12. The trap as claimed in claim 11, wherein the crank is rotatably arranged for eccentric rotation about the crank rotational axis as determined by a bearing housed in a crank housing mounted to a frame of the trap; and wherein the motor coupler is configured to releasably couple the motor against the crank at a side of the crank housing facing the motor.

13. The trap as claimed in claim 1, wherein, in the unstable equilibrium at or near the dead center position, a torque generated on the crank by the force exerted by the elastic element in the strained state is substantially zero.

14. A method for catching a rat, comprising the following steps:

a) providing a trap as claimed in claim 1;

b) attracting a rat;

c) detecting the rat on the cover with the sensor;

d) when a rat is detected on the cover, relaxing the elastic element, thereby moving the cover from the closed position to an open position, and switching the trap from the unstable equilibrium to a stable equilibrium, thus opening the opening in the receptacle so that the rat falls into the receptacle;

e) once the rat has fallen into the receptacle, moving the cover from the open position to the closed position by actuating the actuator, thereby straining the elastic element and positioning the trap in the unstable equilibrium.

15. The method as claimed in claim 14, wherein, in step d), the motor, with a push, takes the trap out of the unstable equilibrium, and wherein the elastic element moves the cover to the open position once the trap has been taken out of the unstable equilibrium by the motor.

16. The method as claimed in claim 14, wherein vibrations caused by a rat on the cover takes the trap out of the unstable equilibrium, and wherein the elastic element moves the cover to the open position once the trap has been taken out of the unstable equilibrium.

17. The method as claimed in claim 14, wherein the receptacle comprises a fluid and the trap comprises a rat volume detection system, preferably, the rat volume detection system comprises a fluid level sensor, and wherein the method comprises the further step of based on the volume of an average rat, making an estimate of the number of rats caught via the rat volume detection system.

18. The method as claimed in claim 17, wherein the trap further comprises a communication module, and wherein the communication module transmits a total catch signal once the trap has caught a predetermined volume or number of rats, and wherein optionally, the communication module transmits an incremental catch signal when a specified change in volume is detected, e.g. a change in volume that is between 25% and 200% of the average volume of a full-grown rat.

19. The method as claimed in claim 14, wherein the trap is further equipped with a weighing system for weighing the feeder, wherein this weighing system is calibrated when the trap is set up and/or periodically, wherein calibration is performed by lifting the feeder off a weight sensor located under the feeder, and measuring the signal from this sensor, thereby obtaining a zero measurement for calibration.

\* \* \* \* \*